United States Patent [19]

Velasco et al.

[11] Patent Number: 5,078,030
[45] Date of Patent: Jan. 7, 1992

[54] APPARATUS FOR REMOTELY ADJUSTING TRANSMISSION VACUUM MODULATORS

[75] Inventors: Robert Velasco; John D. Coons, both of San Jose, Calif.

[73] Assignee: Robolen Products, San Jose, Calif.

[21] Appl. No.: 498,719

[22] Filed: Mar. 26, 1990

[51] Int. Cl.$^5$ .............................................. B25B 13/00
[52] U.S. Cl. ........................................ 81/52; 81/57.13; 81/57.29
[58] Field of Search ................... 81/520, 57.14, 57.13, 81/54, 57.29, 57.3

[56] References Cited

U.S. PATENT DOCUMENTS 4,381,685  5/1983  Brooks .
4,928,558  5/1990  Makhlouf ........................... 81/57.14

Primary Examiner—D. S. Meislin
Assistant Examiner—Lawrence Cruz
Attorney, Agent, or Firm—Rosenblum, Parish & Bacigalupi

[57] ABSTRACT

Apparatus for remotely adjusting transmission vacuum modulators including a clawlike gripping mechanism which can be clamped to the vacuum modulator and including a drive wheel for engaging the modulator adjustment dial wheel, a motor for driving the drive wheel, and an optical detector for monitoring the adjustment process. A remote control unit is connected to the clamping device and includes operator input controls for energizing the drive motor and indicator means responsive to the output of the optical detector for providing an indication of the adjustments made.

17 Claims, 2 Drawing Sheets

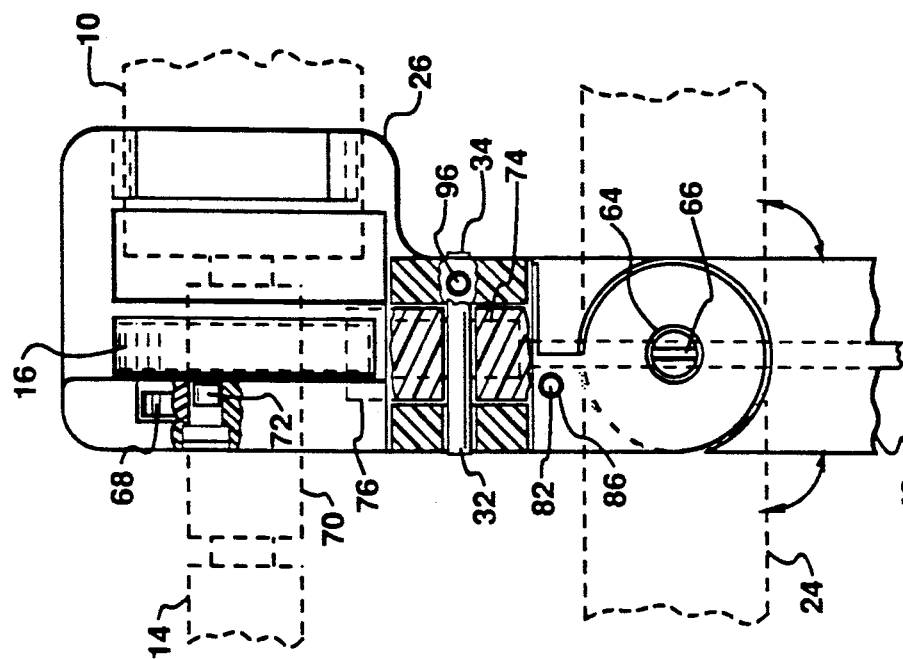
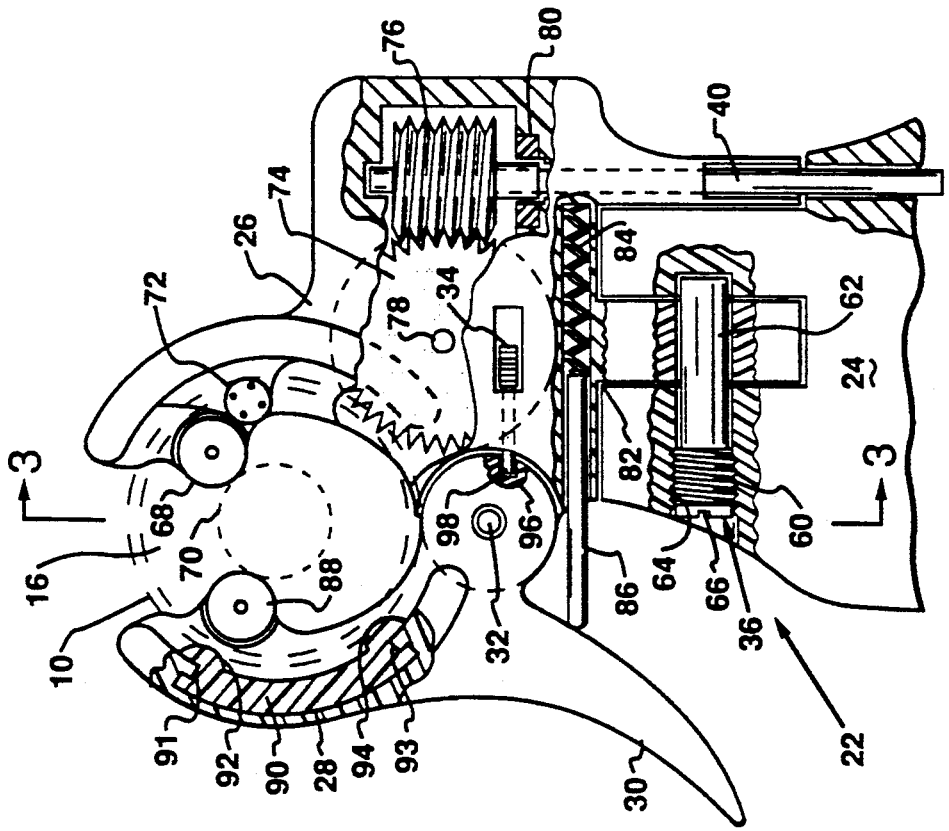

APPARATUS FOR REMOTELY ADJUSTING TRANSMISSION VACUUM MODULATORS

BACKGROUND OF THE INVENTION

1. Field of the Invention

The present invention relates generally to automotive maintenance tools and more particularly to a device for allowing the remote adjustment of the vacuum modulator of an automatic transmission and the like.

This application is related to my co-pending U.S. patent application entitled "Modulator Adjustment Device", Ser. No. 07/335,714, filed Apr. 10, 1989.

2. Description the Prior Art

Automatic transmissions of the types used in modern automobiles have for many years used a manifold vacuum-controlled modulator to cause the transmission to shift from one speed to another. Early modulators utilized a spring-loaded diaphragm which, in response to engine manifold pressure, caused a shifting rod to move in and out of the transmission causing gear shifting to take place. The tension on the diaphragm and thus the amount of vacuum required to move the diaphragm enough to cause shifting could not be adjusted. It was later recognized that transmission operation could be improved if the spring force of the spring loading the modulator diaphragm could be selectively varied. In order to accomplish this change, an adjustment screw was provided. However, in most instances the screw was either placed in the vacuum passage, or itself provided the vacuum passage, and as a consequence, in order to adjust the screw it was necessary that the vacuum line be disconnected and a tool be inserted into the tube fitting to make the adjustments, with the vacuum line subsequently being reconnected. This involved a difficult and time-consuming process because the screw could not be seen inside the tube fitting and accurate adjustments could not easily be made. Furthermore, the adjustment could not be made under normal operating conditions.

As described in my above-identified co-pending Application, the disadvantages of the prior art have now been overcome by the provision of a means for enabling adjustment of the setting screw without requiring that the vacuum line be disconnected. This is accomplished by the provision of a fitting having a gear-toothed dial wheel which is mechanically coupled to the adjustment screw and which includes a coaxial vacuum passage so that adjustments can be made with the vacuum coupling intact.

However, before the present invention, in order to turn the dial wheel it was still necessary for the mechanic to physically locate himself in the vicinity of the modulator in order to make the required adjustment. This of course meant that, unless the car was engaged to a dynamometer, adjustments could not practically be made under operational conditions.

SUMMARY OF THE INVENTION

It is therefore a primary objective of the present invention to provide a means for allowing the dial wheel of a modulator adjustment device of the type described to be remotely adjusted.

Another objective of the present invention is to provide a device of the type described which enables the vacuum modulator to be adjusted by a mechanic seated in the driver's seat of the automobile.

Still another objective of the present invention is to provide a device of the type described having a mechanical or electrically controlled numerical readout which enables the mechanic to make selected adjustments with a high degree of accuracy.

Briefly, a presently preferred embodiment of the present invention includes a clawlike gripping mechanism which can be clamped to the vacuum modulator and includes a drive wheel for engaging the modulator adjustment dial wheel, a motor for driving the drive wheel, and an optical detector for monitoring the adjustment process. A remote control unit is connected to the clamping device and includes operator input controls for energizing the drive motor and indicator means responsive to the output of the optical detector for providing an indication of the adjustments made.

An important advantage of the present invention is that it provides a means which can be quickly attached to the modulator to allow convenient adjustments thereof.

Another advantage of the present invention is that it allows the modulator to be adjusted under actual operating conditions.

Still another advantage of the present invention is that it provides a means for substantially improving the accuracy of modulator adjustment.

These and other objects and advantages of the present invention will no doubt become apparent to those of ordinary skill in the art after having read the following detailed description of the preferred embodiment shown in the several figures of the drawing.

IN THE DRAWING

FIG. 2 is a partial side elevation of the clamping actuator broken as required to illustrate the active components thereof.

FIG. 3 is a partially broken section taken along the line 3—3 of FIG. 2.

DETAILED DESCRIPTION OF THE PREFERRED EMBODIMENT

Figure 1:
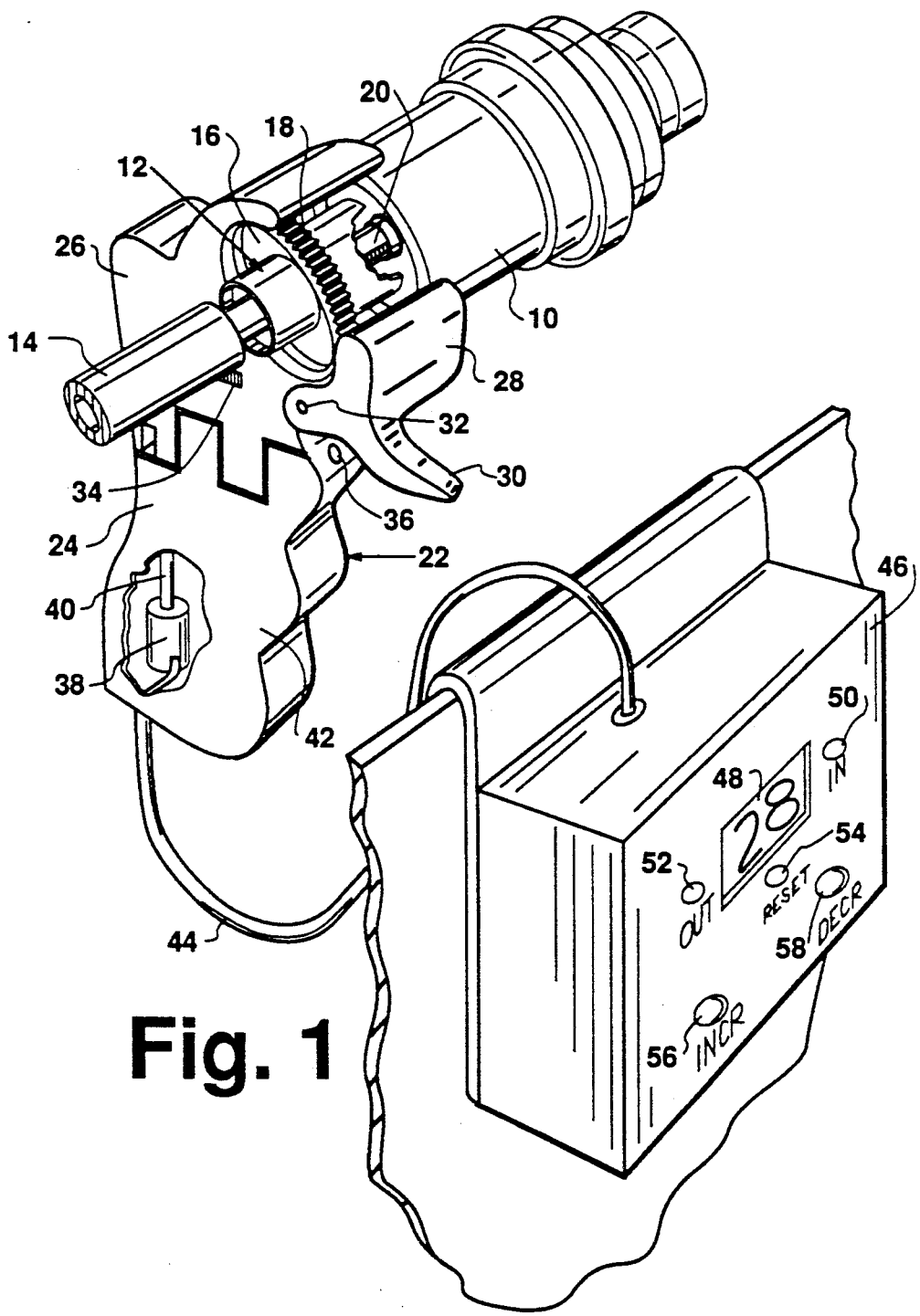
FIG. 1 is a perspective view showing a remote control modulator adjustment device in accordance with the present invention.

Referring now to the drawing, there is shown in FIG. 1 a modulator 10 having an adjustment mechanism 12 (in accordance with my above-identified co-pending U.S. patent application) positioned between the modulator 10 and the vacuum line 14. As may be noted from the drawing, the mechanism 12 includes an adjustment dial wheel 16 having gear teeth 18 provided on its outer perimeter. As described in my co-pending application, the vacuum spring adjustment screw 20 is engaged by the dial wheel so that the screw is turned as the dial wheel is turned. Means are also provided for providing a sealed vacuum passage through the mechanism 12 from vacuum line 14 to modulator 10.

Attached to modulator 10 is a dial wheel drive mechanism in accordance with the present invention and generally designated 22 which is basically comprised of a handle portion 24 pivotally connected to a stationary jaw or claw 26 and a movable jaw or claw 28 pivotally connected to the stationary member 26. Claw 28 includes a trigger-like finger grip 30 which is used to rotate claw 28 outwardly about the pivot pin 32. As will be further described below, the base portion of stationary claw member 26 includes a finger-actuated slide locking means 34 for locking claw 28 in position relative to claw 26. Note also that handle portion 24 is pivotally attached to stationary claw 26 by means of a pivot pin 36 and has enclosed therein digitally controlled electrical bi-directional stepping motor 38 which is connected to a drive means disposed in claw 26 by means of a flexible drive shaft 40. Note also that one side of handle 24 is configured to provide finger grips 42.

Extending from the bottom of handle 24 is an electrical cable 44 which is connected to an electrical control unit 46 that may either be a hand held unit or a mountable unit including a bracket for attachment to the door or window of an automobile containing the transmission to be adjusted. Control unit 46 will typically contain a numerical readout 48, an "in" indicator 50, an "out" indicator 52, a reset button 54, and "increment" and "decrement" buttons 56 and 58 respectively. Unit 46 will also typically include a power supply and any electronics required to perform the desired motor control and indication functions.

In use, a mechanic will clamp the unit 22 onto the end housing of a modulator 10 having a dial wheel adjustment feature and then adjust the spring tension of the modulator by merely depressing either the increment or decrement button on control unit 46 until the desired shifting operation is achieved.

Turning now to FIGS. 2 and 3 of the drawing, other details of unit 22 will be discussed. Referring specifically to FIG. 2, details of the pivotal connection of handle portion 24 to stationary claw 26 by means of the pivot pin 36 are shown in broken away section. Pin 36 includes a threaded portion 60 and an unthreaded pivot shaft portion 62 which extends through the interdigitated mating projections of handle 24 and member 26. Pin 36 is inserted into the partially threaded bore 64 and threaded thereinto by means of an appropriate tool inserted into the straight blade phillips, allen or other driver coupling means provided at 66 in the head of pin 36.

Claw member 26 includes a roller 68 for engaging the cylindrical barrel portion 70 of dial wheel 16, a photosensor 72 for sensing either the gear teeth 18 (FIG. 1) or other suitable marker indicia provided in wheel 16. Disposed within a cavity formed within the base portion of member 26 is a gear wheel 74 which is adapted to drivingly engage wheel 16 and to be drivingly engaged by a worm gear 76 attached to the end of the flexible drive shaft 40. Gear wheel 74 rotates about a shaft 78 and worm gear 76 is journaled to member 26 by means of suitable nylon bearings 80 or the like.

Disposed within a bore 82 is a coil spring 84 and spring pin 86 which engages finger grip 30 causing claw member 28 to be resiliently biased to rotate in the clockwise direction such that roller 88 carried by claw 28 engages dial cylinder 70. Note that a resilient insert 90 is provided in claw 28 for engaging the outer housing of modulator 10 as indicated at 92 and 94 to prevent rotation of the mechanism 22 about the modulator 10 as wheel 16 is driven. In order to ensure that mechanism 22 does not become dislodged from the modulator 10 due to vibration or shock, claw 28 can be locked in position by the slide lock 34 which includes a lock pin 96 that matingly engages a detent 98 formed in member 28.

In order to accommodate different modulator sizes, a plurality of variously configured resilient inserts 90 may be provided in accordance with the present invention. The user will merely select the appropriate insert, slide it into position in claw 28 in the slot formed by shoulders 91 and 93, and at that point be ready to use the device.

As more clearly indicated in FIG. 3, handle portion 24 can be rotated as much as 90 degrees in either direction about pin 36 to accommodate positioning of mechanism 22 in the presence of obstacles which would otherwise block access to the modulator.

In operation, with either one of my adjustment devices attached to a modulator, or with a modulator modified to include one of my adjustment mechanisms, the claws of mechanism 22 would be opened by finger pressure applied to finger grip 30, and the claws would be released and closed by spring pin 86 about the adjustment wheel 16 with the gripping pad 90 engaging the outer surface of the housing of modulator 10 and the rollers 68 and 88 engaging the barrel 70. Slide lock 34 would then be moved leftwardly, as illustrated in FIG. 2, to lock the unit into place. The mechanic would then reset the remote control unit 46 to zero, or any other predetermined value, and then cause the modulator to be adjusted by pressing the increment button 56 or decrement button 58. The direction of change of the dial wheel 16 from the reset position is indicated by the "in" and "out" buttons 50 and 52, respectively, while the amount of change will be indicated by the numerical readout 48. Since the control unit 40 can be easily hung over a door window, the driver is free to operate the vehicle in normal driving conditions and perform appropriate adjustments as required without substantially diverting his attention from operation of the vehicle.

Although the present invention has been described above in terms of a presently preferred embodiment, it will be appreciated that numerous alterations and modifications thereof are likely to become apparent after having read the above disclosure. For example, it should be apparent that alternatively motor 38 could be located in control unit 46 and drivably connected to mechanism 22 by a long flexible coaxial shaft, or for that matter could be replaced with a simple manual drive wheel and connecting flexible shaft. Similarly, although the preferred embodiment is shown as including a geared drive mechanism, the device could be implemented to include frictional drive elements, ratcheted drive elements, or any other suitable means of imparting rotational energy between a drive source and the dial wheel.

It is therefore intended that the appended claims be interpreted as covering all such alterations and modifications as fall within the true spirit and scope of the invention.

What is claimed is:

1. An apparatus for remotely adjusting the dial wheel of an adjustable modulator comprising:

drive means for drivingly engaging said dial wheel;

attachment means for attaching said drive means to said modulator and in driving engagement with said dial wheel, said attachment means including detector means for detecting rotation of said dial wheel; and remote control means operatively coupled to said drive means for supplying drive energy thereto such that, in response to inputs selectively applied to said control means, said dial wheel may be rotated to adjust said modulator, said control means including indicator means coupled to said detector means and operative to indicate the detected rotation of said dial wheel.

2. Apparatus as recited in claim 1 wherein said attachment means includes a pair of clawlike members pivotally attached to each other and operative to clampingly engage said modulator.

3. Apparatus as recited in claim 2 wherein said attachment means further includes a handle portion pivotally connected to one of said clawlike members for facilitating use of said device in space restricted positions.

4. Apparatus as recited in claim 1 wherein said drive means includes a drive wheel operatively coupled to said remote control means and adapted to drivably engage the perimeter of said dial wheel to impart rotary energy thereto.

5. Apparatus as recited in claim 4 wherein said drive means includes an electrical motor for imparting bi-directional drive to said drive wheel for turning said dial wheel.

6. Apparatus as recited in claim 5 wherein said attachment means includes a handle portion pivotally attached to a modulator gripping means, and wherein said electrical motor is coupled to said drive wheel by a flexible drive shaft.

7. Apparatus as recited in claim 6 wherein said dial wheel has gear teeth provided on its perimeter and wherein said drive wheel is a rotary gear having gear teeth adapted to drivingly engage the teeth of said dial wheel.

8. Apparatus as recited in claim 7 wherein said drive wheel is driven by a worm gear attached to one end of said flexible drive shaft.

9. Apparatus as recited in claim 1 wherein said drive means includes an electrical motor mechanically coupled to said dial wheel and said control means includes an electrical control system for supplying actuating energy to said motor.

10. Apparatus as recited in claim 9 wherein said attachment means includes a pair of spring loaded clawlike members pivotally attached to each other and operative to clampingly engage said modulator.

11. Apparatus as recited in claim 9 wherein said drive means includes a drive wheel mechanically coupling said motor to said dial wheel, said drive wheel being adapted to drivably engage the perimeter of said dial wheel to impart rotary energy thereto.

12. Apparatus as recited in claim 11 wherein said electrical motor is a digitally controlled stepping motor for imparting bi-directional drive to said drive wheel for turning said dial wheel.

13. Apparatus as recited in claim 12 wherein said attachment means includes a handle portion carrying said motor and pivotally attached to a modulator gripping means, and wherein said motor is coupled to said drive wheel by a flexible drive shaft.

14. Apparatus as recited in claim 13 wherein said dial wheel has gear teeth provided on its perimeter and wherein said drive wheel is a rotary gear having gear teeth adapted to drivingly engage the teeth of said dial wheel.

15. Apparatus as recited in claim 13 wherein said drive wheel is driven by a worm gear attached to one end of said flexible drive shaft.

16. Apparatus as recited in claim 1 wherein said drive means includes an electrical motor mechanically coupled to said dial wheel and said control means includes an electrical control system for supplying actuating energy to said motor.

17. An apparatus for remotely adjusting the toothed dial wheel of an adjustable modulator comprising:
   drive means for drivingly engaging said dial wheel, said drive means including an electrical motor for imparting bi-directional drive to said drive wheel;
   attachment means for attaching said drive means to said modulator and in driving engagement with said drive wheel, said attachment means including a handle portion pivotally attached to a modulator/gripping means, said electrical motor being coupled to said drive wheel by a flexible drive shaft, said dial wheel being a rotary gear having gear teeth provided on its perimeter adapted to drivably engage the teeth of said dial wheel; and
   remote control means operatively coupled to said drive means for supplying drive energy thereto such that, in response to inputs selectively applied to said control means, said dial wheel may be rotated to adjust said modulator.

* * * * *